(12) United States Patent
McCormack et al.

(10) Patent No.: US 6,360,255 B1
(45) Date of Patent: Mar. 19, 2002

(54) AUTOMATICALLY INTEGRATING AN EXTERNAL NETWORK WITH A NETWORK MANAGEMENT SYSTEM

(75) Inventors: John McCormack; Keith Redfield, both of San Jose; Narayan Thyagarajan, Fremont, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/105,342

(22) Filed: Jun. 25, 1998

(51) Int. Cl.$^7$ ................... G06F 15/177; G06F 15/16; H04L 12/28
(52) U.S. Cl. ................... 709/221; 709/224; 370/254
(58) Field of Search ................... 709/231, 221, 709/217, 220, 224, 228; 370/254, 255; 717/11, 3; 379/201, 34; 713/47, 100

(56) References Cited

U.S. PATENT DOCUMENTS

| | | | |
|---|---|---|---|
| 4,809,170 A | * 2/1989 | Leblang et al. ............... 717/3 |
| 5,537,626 A | * 7/1996 | Kraslavsky et al. ........... 710/8 |
| 5,579,509 A | * 11/1996 | Furtney et al. ............... 703/27 |
| 5,604,906 A | * 2/1997 | Murphy et al. ............... 717/11 |
| 5,734,642 A | * 3/1998 | Vaishnavi et al. ........... 370/255 |
| 5,734,822 A | * 3/1998 | Houda et al. ............... 709/230 |
| 5,799,189 A | * 8/1998 | Koser et al. ................. 709/319 |
| 5,802,146 A | * 9/1998 | Dulman ......................... 379/34 |
| 5,915,008 A | * 6/1999 | Dulman ......................... 379/201 |
| 5,926,623 A | * 7/1999 | Tsukakoshi et al. ........ 709/200 |
| 6,009,274 A | * 12/1999 | Fletcher et al. ............... 717/11 |
| 6,046,988 A | * 4/2000 | Schenkel et al. ............ 370/254 |
| 6,058,428 A | * 5/2000 | Wang et al. ................. 709/232 |
| 6,061,504 A | * 5/2000 | Tzelnic et al. ............... 709/219 |
| 6,061,722 A | * 5/2000 | Lipa et al. .................... 709/224 |
| 6,074,435 A | * 6/2000 | Rojestal ......................... 717/11 |
| 6,098,097 A | * 8/2000 | Dean et al. .................. 709/220 |
| 6,122,639 A | * 9/2000 | Babu et al. ............. 707/103 R |
| 6,141,683 A | * 10/2000 | Kraml et al. ................. 709/220 |
| 6,202,206 B1 | * 3/2001 | Dean et al. .................... 717/11 |
| 6,219,336 B1 | * 4/2001 | Takahashi et al. ........... 370/223 |
| 6,282,712 B1 | * 8/2001 | Davis et al. ................... 717/11 |
| 6,295,527 B1 | * 9/2001 | McCormack et al. .......... 707/3 |

* cited by examiner

*Primary Examiner*—Zarni Maung
*Assistant Examiner*—Jason D. Cardone
(74) *Attorney, Agent, or Firm*—Hickman Palermo Truong & Becker LLP

(57) ABSTRACT

A mechanism and method for integrating a managed network with a network management system is described. The network management system is used to manage, maintain, and display information about one or more managed networks and network devices in them. Devices in the managed network are upgraded by connecting a browser to the network management system, describing devices in the managed network, and selecting appropriate upgrades. The mechanism and method verify that the upgrades can be successfully downloaded to the devices of the managed network. Intelligence about the managed network is automatically gathered, so that the user is presented with a display of only those upgrades that are pertinent to the user's managed network. In another aspect, the mechanism and method facilitate creation and submission to the network management system of problem reports that describe problems with devices in the managed network.

33 Claims, 10 Drawing Sheets

AUTOMATICALLY INTEGRATING AN EXTERNAL NETWORK WITH A NETWORK MANAGEMENT SYSTEM

RELATED APPLICATIONS

The present Application is related to U.S. Pat. No. 6,122, 639, entitled "NETWORK DEVICE INFORMATION COLLECTION AND CHANGE DETECTION," filed by Vidya Babu, Michael F. Fredrich and Christopher A. White, on Dec. 23, 1997 and which issued on Sep. 19, 2000, the content of which is hereby incorporated by reference in its entirety.

FIELD OF THE INVENTION

The present invention generally relates to management of computer networks, and relates specifically to managing a network using a network management system.

BACKGROUND OF THE INVENTION

A computer network generally includes a number of network devices, such as switches, routers, and others, connected so as to allow communication among the devices and end station devices such as desktop machines, servers, hosts, printers, fax machines, and others. Each network device has a processor and a memory; status variables and other values in the memory are continuously changed and updated as the device operates. To monitor the status of a device in the network, a network management station transmits a message requesting information over the network to a software program or agent running on the target device. In response, the agent sends a message over the network to the network management station. The communications are carried out according to an agreed-upon protocol, such as the Simple Network Management Protocol (SNMP).

These networks usually consist of many different types of data switching and routing devices, such as switches, routers, and hubs. Each device can have different physical characteristics. New devices, with characteristics that are presently unknown, are continually developed. In addition, the characteristics of many network devices may change over time. For example, network device characteristics change when subsystems like boards, network interface modules, and other parts are added or removed from a device. In addition, many computer networks contain multiple versions of a particular device type. These multiple versions may themselves have different physical characteristics. For example, one version of a particular routing device may contain 8 megabytes (MB) of random-access memory (RAM) while another version of the same routing device may contain only 6 MBs of RAM.

Because the characteristics and requirements of a computer network often change over time, devices on the network will typically need to be upgraded. In many cases, the upgrading of a device may only require that a new version of software ("Software Upgrade") be loaded into the device's memory.

One approach to providing Software Upgrades to customers of certain devices is by maintaining a computer system, such as an online Internet site or World Wide Web site, which can be accessed to download software for upgrading devices on a computer network. For example, a vendor of network equipment can maintain one or more Web pages that list the devices it sells and the corresponding software that is available for each device. A user of a computer network, typically a computer network administrator ("Administrator"), can then connect to the Web page and to manually select certain software to download in order to upgrade the devices on their computer network.

However, one drawback associated with this approach is that a computer network may contain a large number of devices. Thus, the Administrator must keep track of all the different devices that are maintained on the computer network and the particular software that is currently loaded on each of the devices. In addition, because a particular type of device may contain different hardware configurations, the Administrator must track not only the different types of devices on the computer network, but also the particular configuration of each device on the computer network. For example, if routing device A contains 6 MB of Flash memory, but routing device B contains only 4 MB of Flash memory, then a particular Software Upgrade may fit into the Flash memory of device A but not device B. In a large network, it is impractical for an Administrator to remember and account for these details.

In addition to upgrading network devices, the Administrator typically has the responsibility of diagnosing and solving problems that occur with the network. Often, in diagnosing a problem, the Administrator is forced to call a help-line telephone number of the manufacturer of a particular network device. Once connected with a support person, the Administrator describes the problems that have occurred. In many cases, the support person does not have the technical background to provide the help and information that is required by the Administrator. Instead, the support person creates a problem report consisting of their understanding of the problem and then forwards the report to a technician having an appropriate technical background.

Unfortunately, it is often the case that the problem report contains incorrect and/or incomplete diagnostic information. Thus, the technician is not able to provide a feasible solution based on the information contained in the problem report. Accordingly, several more phone calls may be required before a qualified technical person receives the necessary information. In addition, even if a feasible solution is determined, it is often the case that many phone calls are required before the Administrator and a qualified technician are able to contact one another.

Based on the foregoing, there is a clear need for a mechanism that can be used to automate the upgrading of network devices.

In particular, there is a need for a way to convey information about a customer's particular current network configuration to a manufacturer of one or more of the devices in the network.

In addition, there is also a need to provide a mechanism that can aid in the reporting and diagnosing of network device problems.

SUMMARY OF THE INVENTION

One aspect of the invention encompasses a method for automated upgrading of one or more network devices in a managed network. To perform the automated upgrades, network device information from one or more network devices is discovered. The discovered network device information describes one or more network devices of the managed network. For each of the one or more network devices, one or more software components are identified that contains an upgrade for such network device. The one or more software components are verified for compatibility with each corresponding network device and stored in a location that facilitates downloading of the one or more software components to the network devices.

One feature of this aspect includes displaying a view of the one or more software components to a client associated with the managed network.

Another feature of this aspect is that in discovering network device information, a server is connected to the managed network. One or more SNMP messages are issued to the one or more devices whereby information identifying the one or more devices is collected from the managed network.

Yet another feature of this aspect is that in identifying one or more software components, a device type identifier associated with a particular device of the managed network is determined. One or more of the names that are associated with the device type identifier of the particular device are retrieved from a database that associates names of the components with one or more device type identifier values.

Yet another feature of this aspect is that in verifying for compatibility, a minimum amount of memory of the device that is necessary to load the one or more software components into the device is determined. The actual amount of memory in the device is also determined. It is then determined whether the actual amount is equal to or greater than the minimum amount.

Yet another feature of this aspect includes the downloading of the one or more software components to the devices at the predetermined time.

The invention also encompasses a computer-readable medium, a computer data signal embodied in a carrier wave, and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus of integrating information about an external network into a network management system is disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

In one embodiment, an upgrade mechanism, having a Discovery Engine, acquires device information about devices on a network. Once collected, the device information is presented to a user, such as a System Administrator in the form of HTML pages that can be displayed by a browser executing on a client. The user then selects the devices for which they are interested in performing software upgrades. Based on the user's selections, a filtering mechanism identifies which software, in the form of one or more files or binary images, can be used to upgrade the selected devices. The user is then allowed to select which software images they would like to have downloaded in order to upgrade the selected devices. Thereafter, the software images are automatically downloaded to the corresponding devices.

The process of integrating information about an external network into a network management system is described in various phases. Various phases include a "device discovery" phase, a "software identification" and a "image retrieval" phase. A phase represents a set of operations that is used to perform a particular function. For example, the device discovery phase represents a set of operations that are used to extract information from a set of network devices that are contained in a network.

In certain embodiments, a device diagnostic mechanism is provided. The device diagnostic mechanism can be used to perform diagnostic tests on devices connected to a network. The device diagnostic mechanism identifies potential bugs or problems that are associated with the devices that are connected to the network.

Figure 1A:
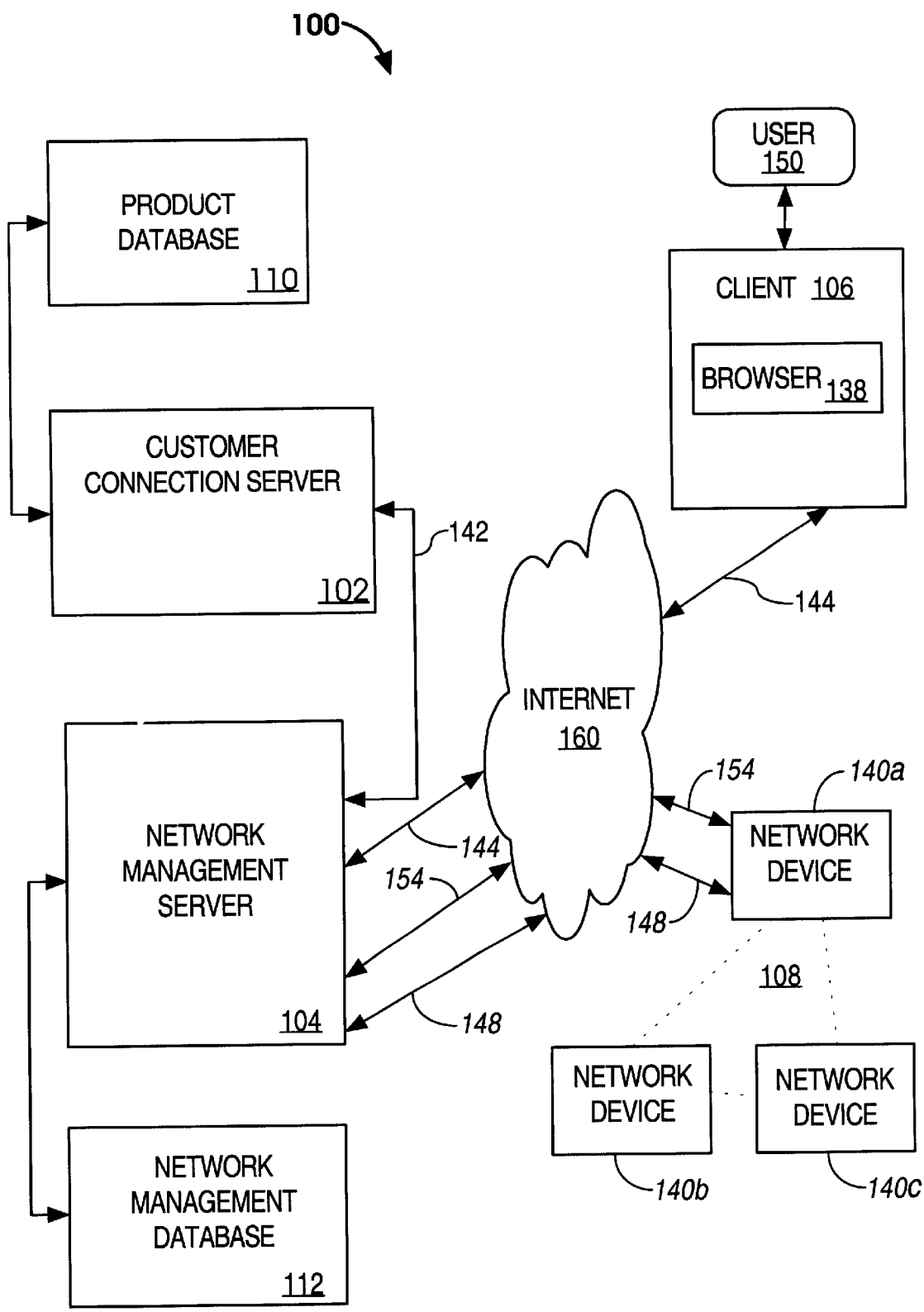
FIG. 1A is a block diagram of a computer system architecture in which the present invention may be utilized.

FIG. 1A is a block diagram of a data processing system 100 in which the invention can be used. Generally, the system 100 includes a network management server 104, a customer connection server 102, a client 106, a product database 110, a network management database 112 and a network 108.

The network 108 is a network comprising any number of network devices 140a, 140b, 140c interconnected by one or more communications channels. Ethernet, Token Ring, and other protocols can characterize the communications channel. The network devices 140a–140c are routers, switches, and other backbone devices that guide data communications among clients and servers. Network 108 is associated with an enterprise, such as a customer of the operator of the network management server 104. Network 108 is sometimes called a "managed network" because it is the subject of network management activities carried out by client 106 or the network management server 104.

The network management server 104 is a computer, or a group of hardware or software components or processes operating in a computer system. The network management server 104 is coupled to the network 108 through connections 148 and 154. In this example, connections 148 and 154 are provided through Internet 160. However, the invention is not limited to connections that are provided through the use of the Internet, as other types of networks may be used that meet the requirements of system 100. Using connection 154, the network management server 104 identifies and extracts device information from the network devices 140a–140c in network 108. Alternatively, using connection 148, the network management server 104 downloads user selected software image files in order to upgrade the software that is contained on one or more of the network devices 140a–140c in network 108. Although connections 148 and 154 are depicted as separate connections, in certain embodiments, connections 148 and 154 are actually the same connection.

The network management server 104 is also coupled with the client 106 through a connection 144. Through connection 144, the network management server 104 sends interface data to client 106 to provide customized views to allow a user 150 to perform software upgrades on the network devices 140a–140c contained in network 108.

The network management server 104 is also coupled with the customer connection server 102 through a connection 142. Using connection 142, the network management server 104 communicates with customer connection server 102 to obtain software product information about certain devices identified in the network 108. Connection 142 is also used to send software image files from customer connection server 102 to network management server 104.

The product database 110 is used to store the software product information and software image files. When requested by the network management server 104, the customer connection server 102 interfaces with the product database 110 to retrieve the necessary data.

The network management database 112 is used to store device information that is obtained from the network devices 140a–140c in network 108 and the software image files that are sent to network management server 104 from customer connection server 102.

Figure 1B:
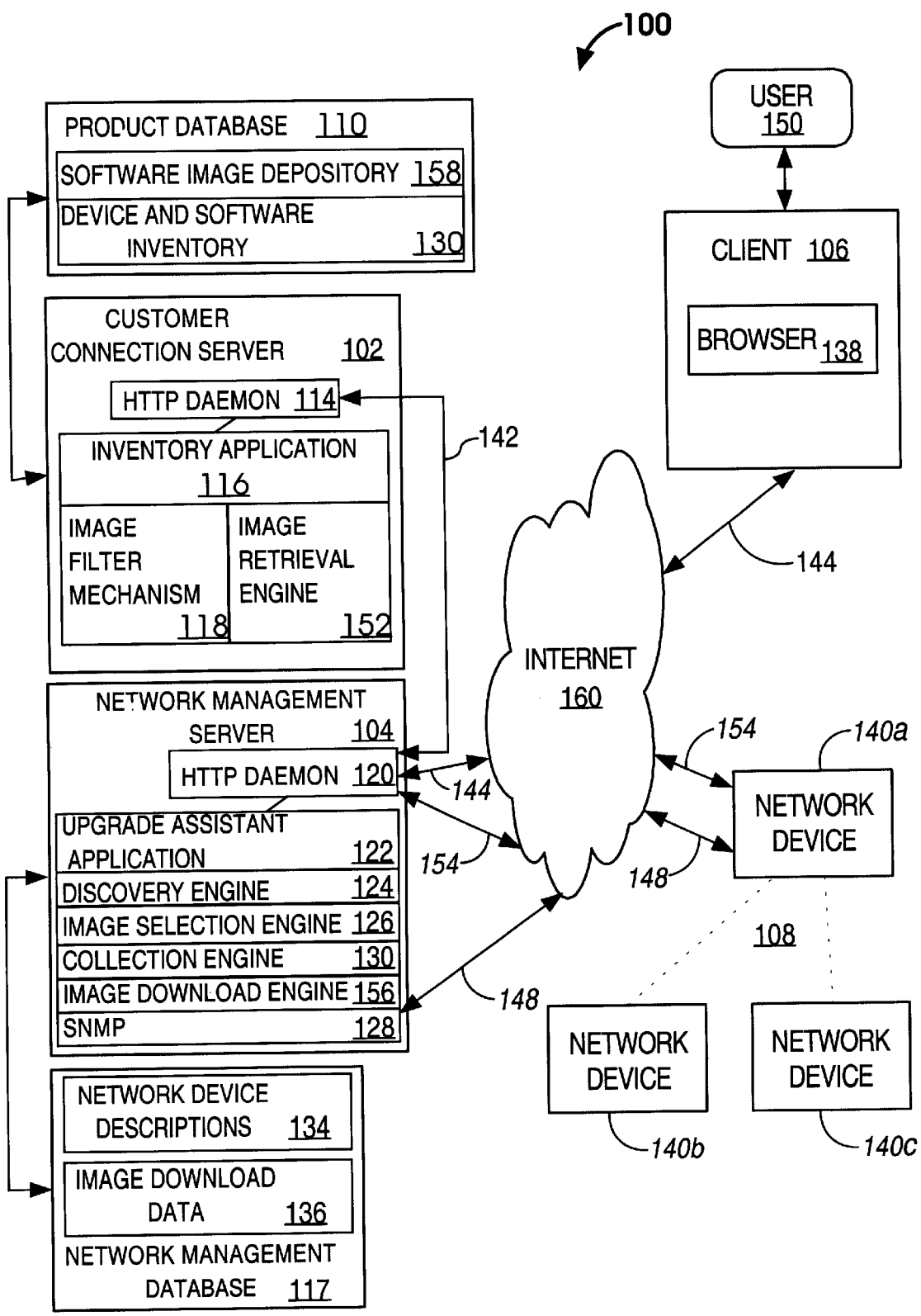
FIG. 1B is a block diagram of the system of FIG. 1A showing certain internal details.

FIG. 1B is a block diagram of the system of FIG. 1A showing certain internal details. As depicted in FIG. 1B, the network management server 104 has a Hypertext Transfer Protocol (HTTP) daemon 120 that can respond to a request from the client 106 to establish an HTTP connection 144 between the network management server 104 and the client 106. In addition, the HTTP daemon 120 can also establish HTTP connections 142 and 154 with customer connection server 102 and network 108. The HTTP connections are data communication channels that are established using a global data communication network such as the Internet as an intermediate communication channel. However, HTTP is merely an example of a communications protocol that can be used in an embodiment. Any other protocol that facilitates exchange of arbitrary information among a client and server can be used. For example, the File Transfer Protocol (FTP) may be used to establish connection 154 as an FTP connection.

Although one client 106 is shown in FIG. 1A and FIG. 1B by way of example, any number of clients can be included in the system 100, and multiple HTTP connections 144 can be used to connect the clients to the network management server 104.

The network management server 104 also runs application programs, such as an upgrade assistant application 122. The upgrade assistant application 122 provides a back-end, server-side mechanism for supervising operations relating to views of information about the network 108 that are requested by the client 106. The assistant application 122 is coupled to a discovery engine 124 that is used in the "device discovery" phase to identify and obtain device information about the network devices 140a–140c in network 108. In this example, the discovery engine stores device information that is obtained during the device discovery phase in a network device description file 134 within the network management database 112. The device discovery phase is described in greater detail below.

An image selection engine 126 is also coupled to the upgrade assistant application 122. The image selection engine 126 is coupled to the customer connection server 102 and is used in the "software identification" phase to obtain a list of software upgrades that can be used to upgrade the network devices that were identified in the device discovery phase. The software identification phase is also described in greater detail below.

A collection engine 130 is also coupled to the upgrade assistant application 122. The collection engine 130 interfaces with the customer connection server 102 through connection 142 and is used in the "image retrieval" phase to obtain a copy of the software files or images that are to be downloaded into the network devices contained in network 108. The collection engine 130 stores the files or images as image download data 136 in network management database 112. Thereafter, an image download engine 156 retrieves the image download data 136 and downloads the software image files into the appropriate network devices through connection 154.

The network management server 104 also has an SNMP Function Library 128 that can communicate using an SNMP connection 148 with network devices 140a, 140b, 140c in the network 108. The SNMP Function Library 128 is a set of functions, subroutines, or objects that enable other programs, such as the upgrade assistant application 122 and discovery engine 124, to communicate with devices in network 108 using SNMP commands and instructions. In certain embodiments, the SNMP Function Library 128 has a published Application Programming Interface (API). Thus, an application program can call functions in the SNMP Function Library 128 by assembling appropriate parameters and then calling a function named in the API using the parameters. The SNMP connection 148 is established over a network, such as the same network used for the connection 144. Alternatively, SNMP connection 148 is established through a different intermediate network.

The network management database 112 is a database server or database system, such as a Sybase® or Oracle® database server and associated components. The network management database 112 manages data tables that store network device descriptions 134 and image download data 136.

The network management database 112 is merely exemplary. Any persistent store may be used as an alternative, such as a flat file, object store, or others. More than one persistent store can be used. In addition, the network device descriptions 134 and image download data 136 may actually be stored in separate databases.

The customer connection server 102 is a computer system, or a group of hardware or software components or processes operating in a computer system. The customer connection server 102 has a Hypertext Transfer Protocol (HTTP) server, process or daemon 114 that can respond to requests from the network management server 104 to establish an HTTP connection 142 between the customer connection server 102 and the network manager server 104. The HTTP connection 142 is a data communications channel that is established using an intermediate network. The intermediate network is not limited to any particular type of network. For example, the intermediate network may be a company's private internal network or intranet, or a global data communication network such as the Internet. However, as previously indicated, HTTP is merely an example of a communications protocol that can be used in an embodiment. Any other protocol that facilitates exchange of arbitrary information among a client and server can be used.

The customer connection server 102 also runs one or more application programs, such as an inventory application 116. The inventory application 116 provides a back-end, server-side mechanism for supervising operations relating to software downloading that are requested by the network management server 104. The inventory application 116 is coupled to an image filter mechanism 118 and an image retrieval engine 152. The image filter mechanism 118 is used to process software image requests that are sent by the network management server 104 over connection 142. Upon receiving a software image information request, the image filter mechanism 118 interfaces with a device and software inventory 130 in product database 110 to retrieve software image information about requested network devices. After retrieving the software image information, the image filter mechanism 118 sends the software image information back to the network management server 104 over connection 142.

Once a user selects a set of software image files to download, the image retrieval engine 152 retrieves the corresponding software image files from a software image depository 158 in product database 110 and sends them to the network management server 104 over connection 142. The software image depository 158 is a centralized storage location, also called an image library or library, of files that can be loaded into and executed by network devices 140a–140c. The files are also called software images.

The product database 110 is a database server or database system, such as a Sybase® or Oracle® database server and associated components. The product database 110 manages data tables that store software image data and device and software information about available devices. In certain embodiments, the product database 110 contains code written in a programming language or a scripting language such as PERL and provides a standardized Application Program Interface (API) that can be used to retrieve information from the database.

The product database 110 is merely exemplary. Any persistent store may be used as an alternative, such as a flat file, object store, or others. More than one persistent store can be used. In addition, the software image depository 158 and device and software inventory information 130 may actually be stored in separate databases.

The invention is not limited to the context shown in FIG. 1A and FIG. 1B, and the spirit and scope of the invention include other contexts and applications in which the functions of the filter mechanism described herein are available to another mechanism, method, program, or process.

Upgrading Network Devices

Figure 2A:
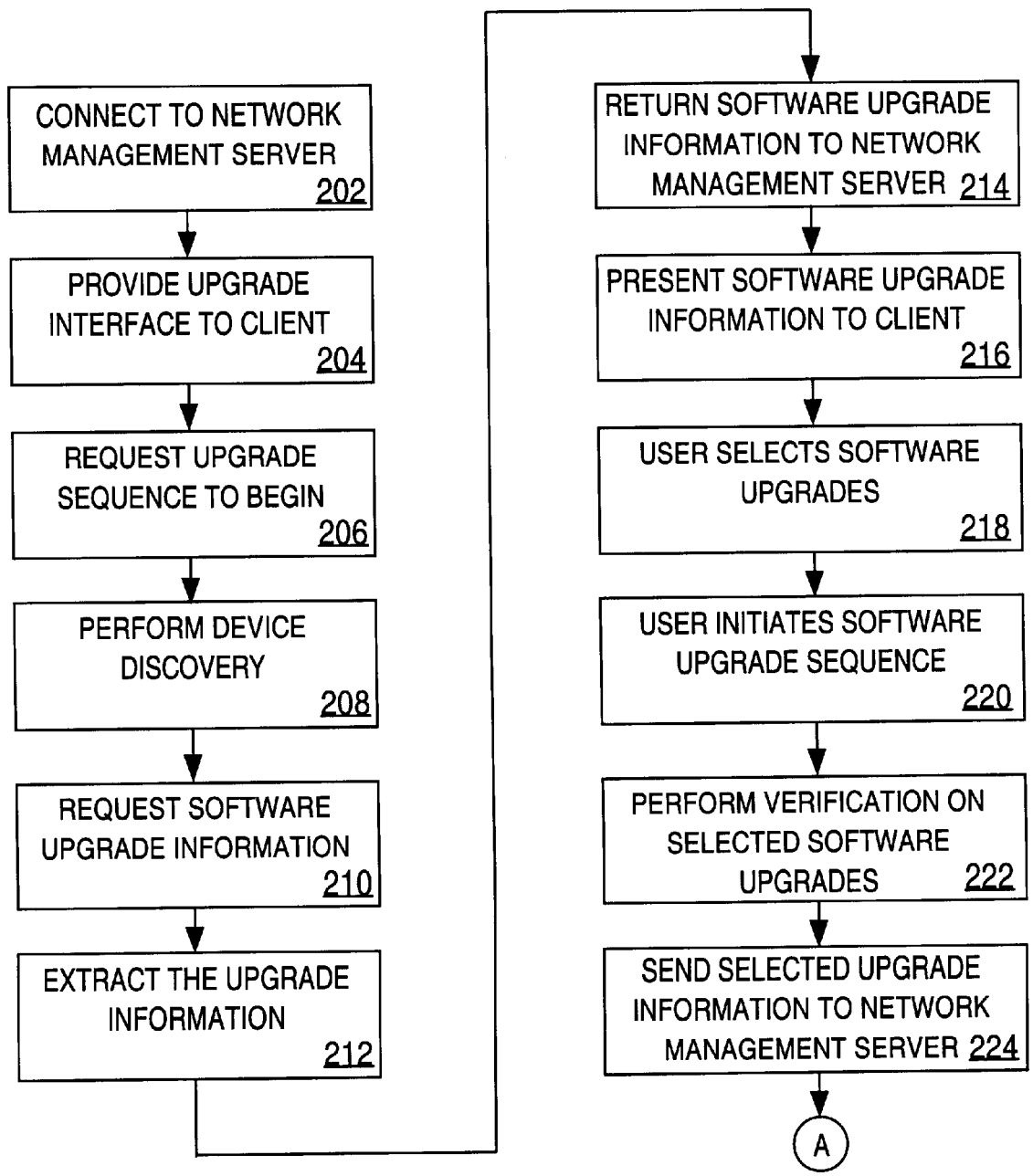
FIG. 2A is a flow diagram that illustrates steps involved in a method of upgrading of network devices.
Figure 2B:
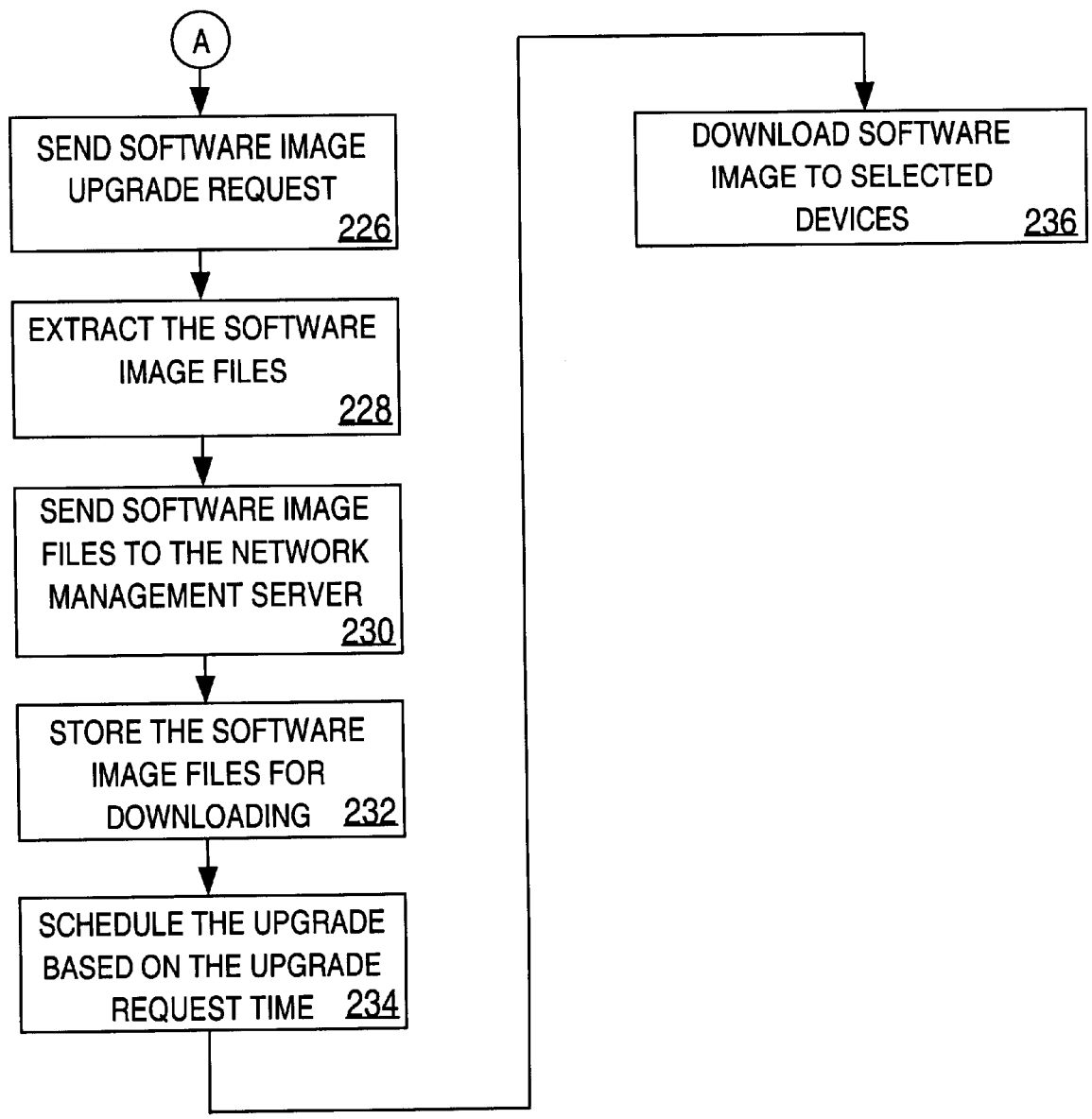
FIG. 2B is a flow diagram that illustrates further steps in the method of FIG. 2A.

FIG. 2A and FIG. 2B are flow diagrams that illustrate a method of upgrading of network devices that can be used in the foregoing context. The steps of FIG. 2A and FIG. 2B will be explained with reference to the components of FIG. 1A and FIG. 1B.

At block 202, a user connects to a central server such as a network management server. For example, in one embodiment, user 150 establishes a connection 144 with network management server 104 using browser 138 on client 106. To establish the connection 144, user 150 is required to enter a login ID and password. Network management server 104 uses the login ID and password to authenticate client 106 as an authorized client.

As shown by block 204, the central server provides upgrade interface information to the client for display at the client. For example, upgrade assistant application 122 sends upgrade interface data to client 106 that is displayed on browser 138. In certain embodiments, the upgrade interface data causes an HTML page to be displayed on browser 138. By interfacing with the HTML page, the user 150 can initiate a software upgrade sequence.

As shown by block 206, the user requests an upgrade sequence to begin. In general, the user may cause the upgrade sequence to begin by filling in a form or selecting a button that sends a messages to the central server requesting the upgrade sequence to begin. For example, the user 150 interacts with the HTML page to begin the upgrade sequence. In certain embodiments, the user 150 is allowed to specify a subset of network devices that are contained in the network 108 for which device discovery is to be performed. The user 150 may request that the device discovery phase only be performed on network devices 140a and 140c.

As shown by block 208, a device discovery phase is performed. For example, the discovery engine 124 interfaces with functions in the SNMP Function Library 128 to establish an SNMP connection 148 with the network devices 140a, 140b, 140c in the network 108. The discovery engine 124 then extracts network device information from the network devices that are contained in the network 108. The extracted network device information contains such information as the device type (for example, router 100 or switch 2000), the model of each device type (for example, router 100A or 100B), the memory capacity (ram and flash memory) and the current software version that is loaded on each device. Methods of extracting network device information from network devices are well known in the art. For example, an SNMP message is sent to a network device, and the message contains a request for information contained in a particular MIB of the network device. The network device replies with an SNMP message that contains the requested information. Another method of extracting network device information from a network is described in U.S. Pat. No. 6,122,639, entitled "Network Device Information Collection and Change Detection".

As part of the device discovery phase, the discovery engine 124 stores the extracted network device information in one or more network device descriptions 134 contained in network management database 112. In certain embodiments, the network device information is stored in network device descriptions 134 in the form of one or more tables of a database that can respond to Structured Query Language (SQL) statements.

As shown by block 210, a software identification phase is carried out. For example, to begin the software identification phase, the image selection engine 126 communicates with the customer connection server 102 through connection 142 to request software upgrade information for the network devices that were identified in the device discovery phase. In communicating with the customer connection server 102, the interface daemon 120 in network management server 104 communicates with the interface daemon 114 in customer connection server 102 to create connection 142. In one embodiment, a client/server relationship is created with the network management server 104 functioning as the client and the customer connection server 102 functioning as the server. Once the connection 142 is established, the image selection engine 126 reads the network device information in network device descriptions 134 and causes it to be sent to the customer connection server 102. In certain embodiments, the software upgrade information request is sent in the form of sequel data.

As shown by block 212, upgrade information is extracted from a product database. For example, the inventory application 116 receives the network device information over the connection 142 and passes it to the image filter mechanism 118. The image filter mechanism 118 then extracts the corresponding software upgrade information from the device and software inventory tables 130 in the product database 110. In one embodiment, the device and software inventory tables 130 contain information on all available network devices and corresponding software products.

As shown by block 214, the customer server determines what upgrades can be applied to the managed network. For example, the image filter mechanism 118 passes the extracted software upgrade information back to the inventory application 116. The inventory application 116 then sends the extracted software upgrade information to the network management server 104 over connection 142.

As shown by block 216, based on information describing the applicable upgrades, a customized view of applicable upgrade information is prepared. For example, the upgrade assistant application 122 receives the extracted software upgrade information and passes it to the collection engine 130. The collection engine 130 then formats the extracted software upgrade information to create a customized view of only the software upgrade information that is pertinent to the network device configuration of network 108. The customized view is then sent over connection 144 and displayed on the browser 138 on client 106. In certain embodiments, the customized view is a customized HTML page that can be displayed using a typical browser, such as Netscape Navigator® or Microsoft Internet Explorer®.

As shown by block 218, a user selects one or more desired upgrades. For example, by interacting with the customized view, the user 150 selects a particular set of software upgrades for which the user wishes to download into certain network devices contained in network 108.

Figure 3A:
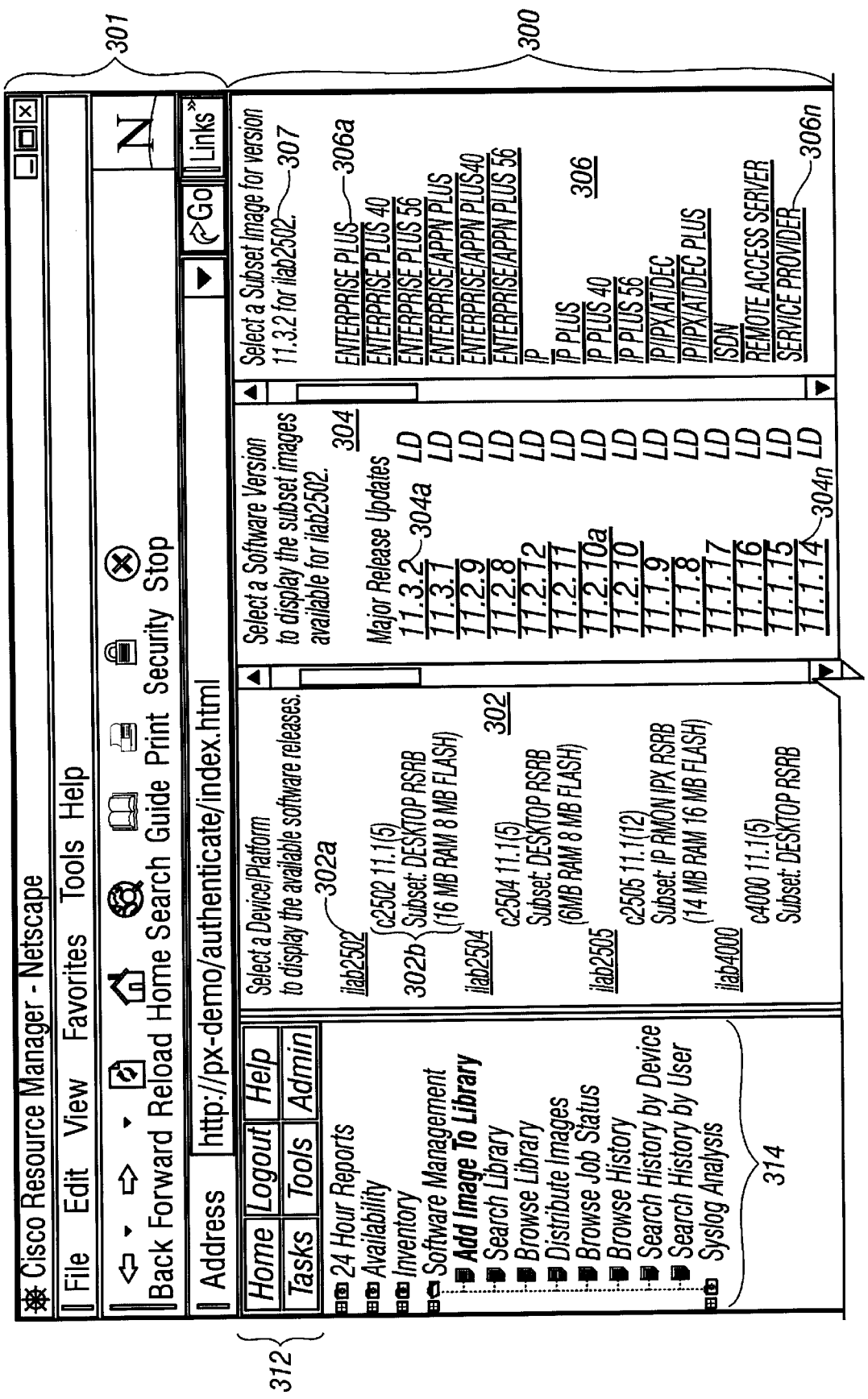
FIG. 3 illustrates an exemplary customized view presented to a user requesting to perform a software upgrade.
Figure 3B:
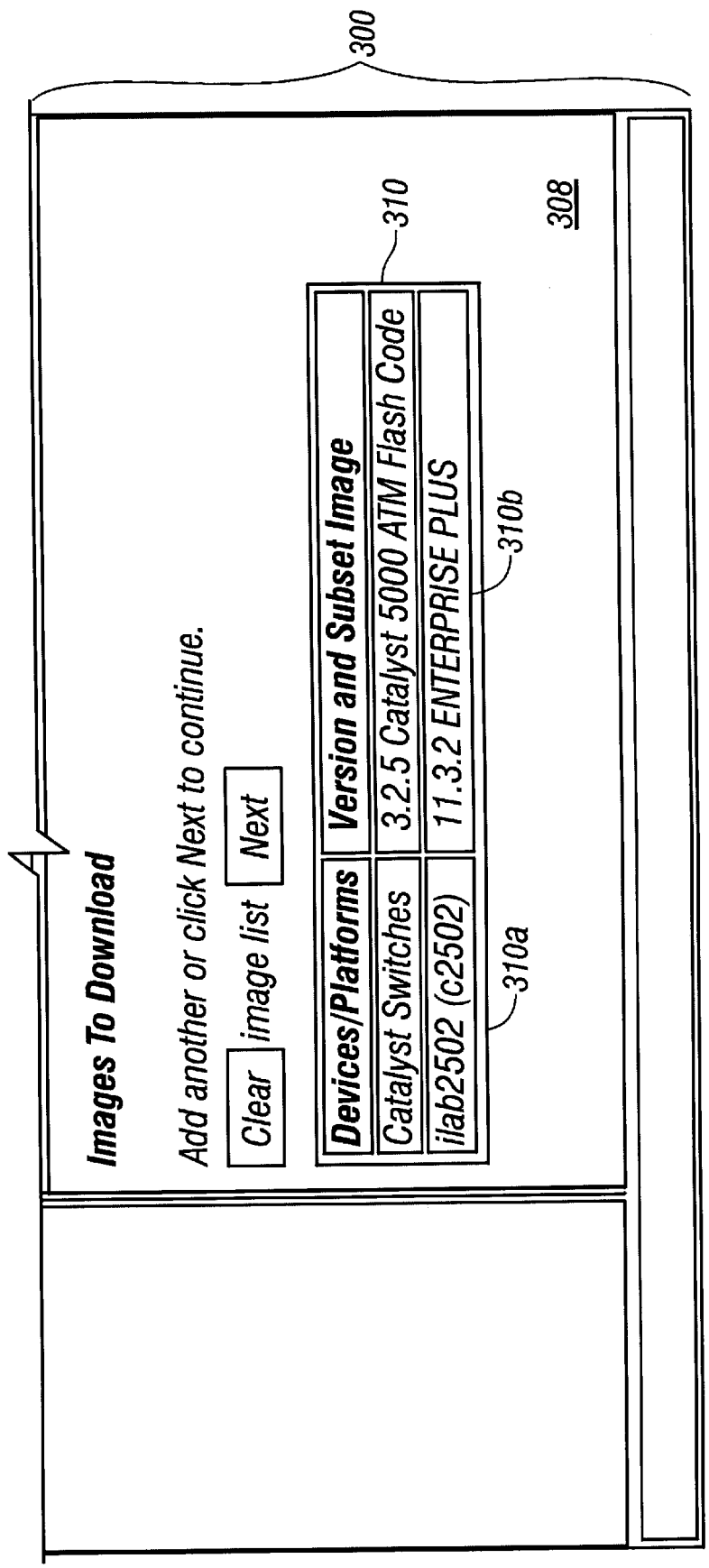

FIG. 3 illustrates an exemplary customized view 300 that is presented to a user requesting to perform a software upgrade. The steps of block 216 and block 218 may involve displaying the view 300 and receiving user input based on the view. In the example of FIG. 3, the view 300 comprises first, second, and third frames 302, 304, 306; a command browser 314; and command buttons 312. Each frame is a scrollable list of information, including one or more hypertext links. The frames 302–306 may be generated using appropriate commands or keywords arranged in an HTML file that is read, interpreted, and displayed by a frames-capable browser. Such browsers, such as Netscape® Navigator, generally display one or more navigation command buttons in a command region 301.

Frame 302 displays a list of available software releases that correspond to the network devices that were identified in the network during the device discovery phase. In the preferred embodiment, each software release displayed in frame 302 comprises a release name hyperlink 302a and a description 302b of the device that corresponds to the software release. For example, in FIG. 3, all or part of four (4) software releases are shown in frame 302. The first software release is identified as "ilab2502" by the hyperlink 302a. A description 302b indicates that software release "ilab2502" is intended for Cisco model 2502 devices, running operating system release 11.1(5), having 16 MB RAM, etc.

Frame 304 contains a list of software versions that are available for a particular software release identified in frame 302. By selecting a particular network device in frame 302, the corresponding available software versions are automatically displayed in frame 304. In the example of FIG. 3, software release "ilab2502" is selected, and frame 304 shows software versions available for release "ilab2502." Each version is identified by a hyperlink such as one of the hyperlinks 304a–304n. A user may select a hyperlink 304a–304n to indicate that the user desires to download that update.

Frame 306 contains a list of software images that are available for a particular software version. By selecting a particular software version in frame 304, the corresponding subset of available software images are automatically displayed in frame 306. For example, as shown in FIG. 3, when software version "11.3.2" is selected for software release "ilab2502," hyperlinks 306a–306n are displayed, as indicated by text 307. Each of the hyperlinks 306a–306n corresponds to one of the available subset images. A user may select a particular image by clicking on the appropriate hyperlink 306a–306n.

Frame 308 contains a selected upgrade table 310 that indicates the software upgrades (software versions and subset images) that have been selected by the user 150. The upgrade table 310 comprises a device/platform column 310a and a version/subset image column 310b. The device/platform column 310a displays one or more devices or platforms for which the user has selected an image to download. The version/subset image column 310b displays a software release version and image name corresponding to the selected device or platform. Information for column 310a is derived from user selections in frame 302. Information for column 310b is derived from user selections made in frame 304 and frame 306. In certain embodiments, a shopping cart is provided that allows users to add and delete software upgrade requests.

At step 220, the user completes the selection of software upgrades and initiates a software upgrade process or sequence. In certain embodiments, the user 150 is allowed to select a particular "upgrade request time" for which the actual downloading of the selected software upgrades will be performed on the network devices in network 108. This enables the user to postpone downloading until a convenient time or until a time when the managed network is expected to be less busy or available for maintenance.

At step 222, an upgrade verification is performed on the selected software images. The upgrade verification determines, for example, if the requested software upgrades can actually be performed on the corresponding network devices.

Figure 4:
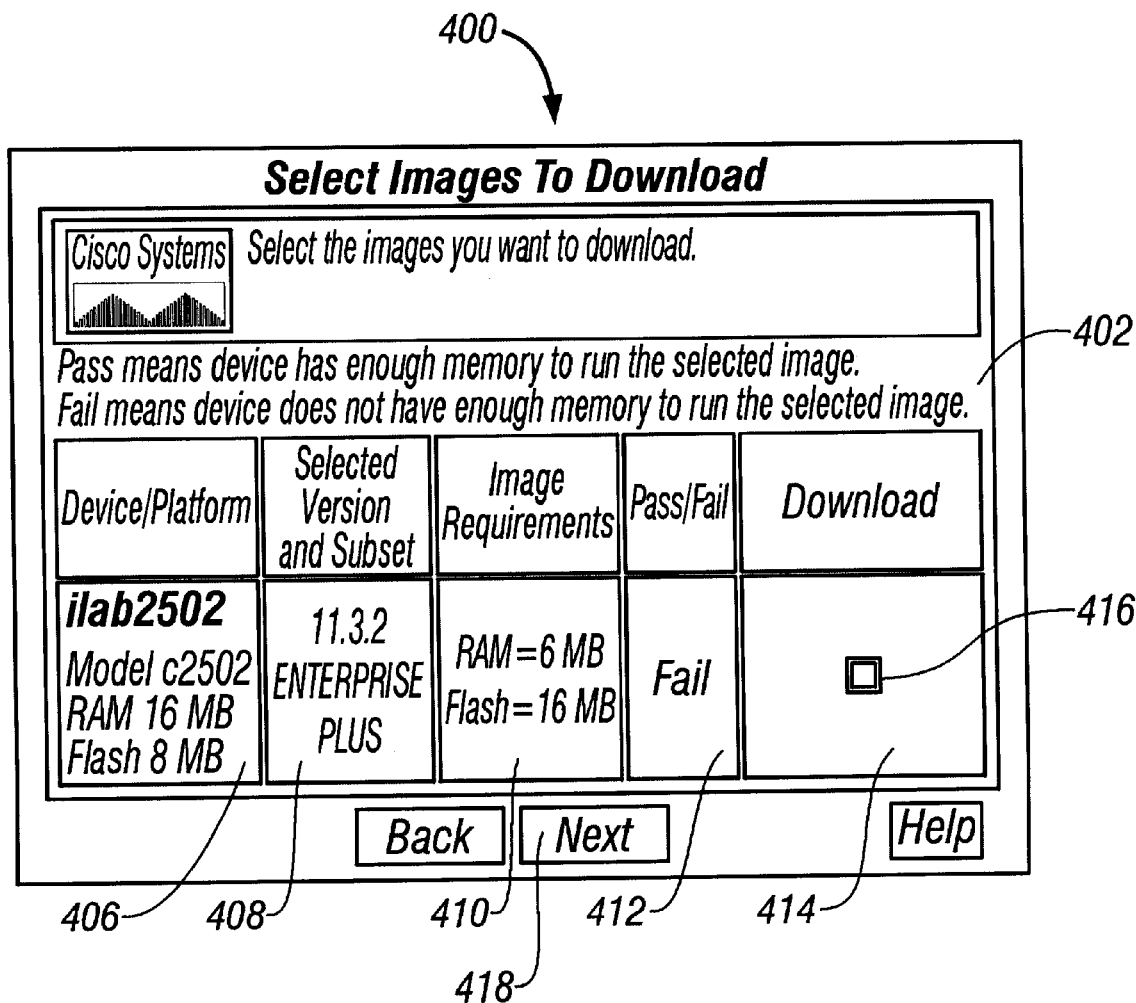
FIG. 4 illustrates an exemplary display presented to a user after a software upgrade sequence is initiated.

FIG. 4 illustrates an exemplary display 400 that is presented to a user after the upgrade verification process is completed. Contained in display 400 is a frame 402 that contains information that indicates whether a selected upgrade image can be downloaded, and potential problems that may arise in performing a particular upgrade of a network device. Frame 402 comprises a device/platform column 406, version/subset column 408, image requirements column 410, pass/fail column 412, and download column 414. The device/platform column 406 identifies the device and platform associated with an image selected for downloading by the user. In the example of FIG. 4, the software release name is "ilab2502" which is intended for c2502 devices. The version/subset column 408 displays the version and subset information selected by the user from frame 304 and frame 306 of view 300. The image requirements column 410 displays the minimum memory required in the device shown in the device/platform column 406 in order to successfully download and install the selected software image.

The pass/fail column 412 indicates whether the upgrade verification process passed or failed for the selected device. The download column 414 contains a checkbox 416. If the pass/fail column 412 indicates PASS, then the user may download the selected image by checking the checkbox 416 and pressing the NEXT button 418.

In this example, the information in frame 402 indicates that the available memory in device "ilab2502" does not satisfy the image requirements of the selected software upgrade. Thus, a status of "Fail" is presented to the user in the pass/fail column 412. In certain embodiments, the user has the ability to override a status of "Fail" to still allow the software upgrade to be performed on the particular device.

Referring again to FIG. 2A and FIG. 2B, as shown by block 224, the selected software upgrade information is sent to the central server. For example, selected software upgrade information is sent from client 106 to network management server 104 over connection 144.

As shown by block 226, the central server receives the upgrade information. For example, the upgrade assistant application 122 receives the selected software upgrade information and passes it to the image download engine 156. The image download engine 156 then initiates the image retrieval phase by causing a software image request to be sent to the customer connection server 102 based on the received selected software upgrade information. The software image request is sent to customer connection server 102 over connection 142.

As shown by block 228, the corresponding software image files are extracted. For example, the inventory application 116 receives and passes the software image request to the image retrieval engine 152. Upon receiving the software image request, the image retrieval engine 152 extracts the corresponding software image files that are identified in the software image request from the software image depository 158 in product database 110.

As shown by block 230, the extracted image files are sent to the central server. For example, the image retrieval engine 152 causes the software image files to be returned to network management server 104 over connection 142. As indicated in block 232, the extracted image files are temporarily stored prior to downloading. For example, the image download engine 156 stores the received software image files in image download data 136 contained in network management database 112.

As shown by block 234, one or more upgrades are scheduled for downloading, based on time information provided by the user. For example, image download engine 156 schedules the downloading of the software image files to the network devices on network 108 based on the upgrade request time that was requested by the user 150. In certain embodiments, the client 106 is provided with an estimate of the time that it will take to download the selected images. This estimate is displayed on browser 138 for viewing by client 150.

As shown by block 236, the software images are downloaded to the selected devices. For example, at the upgrade request time, the software image files are retrieved from the image download data 136 and then downloaded to the corresponding network devices in network 108. In certain embodiments, an FTP connection 154 is established between the network management server 104 and one or more network devices for downloading the software image files.

In this example the image retrieval engine 152 extracts and sends the corresponding software image files at steps 228 and 230. In certain embodiments, however, the image retrieval engine 152 generates one or more Universal Resource Locators (URLs), based on the software image files requested by the image download engine 156. The URLs identify where the requested software image files are located in the software image depository 158 in product database 110. These URLs are sent back to the network management server 104 and stored in the image download data 136 at step 232. At step 236, the URLs are retrieved from the image download data 136. A connection is established between network management server 104 and customer connection server 102. The URLs are then used to retrieve the software image files from customer connection server 102 to network management server 104. Upon receiving the software image files, the network management server 104 begins downloading them to the corresponding network devices in network 108.

In certain embodiments, the customer connection server 102 maintains a registry file that contains a list of URLs for its corresponding resources. In one embodiment, the URLs are maintained as bookmarks in the registry file. Using the registry file, the network management server 104 can maintain accurate URLs and hypertext links to the resources in customer connection server 102 for which it needs access. For example, the customer connection server 102 may store an URL for a software image file "ilab2502" for downloading to network 108. If the customer connection server 102 moves the software image file "ilab2502" from directory "A" to directory "B", using the registry file, the network management server 104 can update its stored URL appropriately.

Referring again to FIG. 3, command buttons 312 preferably include a Home button, a Logout button, a Help button, a Tasks button, a Tools button and an administrative function (Admin) button. A user 150 may select one of the buttons in conventional manner, for example, by directing a pointing device of the client 106 to the button and pressing a button on the pointing device. Selecting the Home button causes a pre-determined display or Web page, such as a home page of a network management system, to be displayed at the client 106 by browser 138. Selecting the Logout button causes the client to be disconnected from the system 100 or the customer connection server 102. Selecting the Help button causes an interactive help interface to be displayed on the client 106. Selecting the Admin button causes an administration interface to be displayed that provide the user with news and information about the network management system. Selecting the Tools button cause an interface to be displayed that provides the user with various software or program tools that can used in maintaining the managed network 108.

Selecting the Tasks button causes a command browser 314 to be displayed. Command browser 314 comprises a hierarchical list of folders of links, each of which is associated with an application program, feature or function useful in maintaining or displaying information about managed network 108. Selecting a link causes network management server 104 to execute the program, feature or function identified by the link.

Preferably, command browser 314 includes a 24-hour report folder, an availability folder, an inventory folder, a software management folder and a Syslog analysis folder. The 24-hour report folder includes links for reporting network device problems. The availability folder contains links for checking that availability of new software products. The inventory folder contains links for all available software products. The Syslog analysis folder contains links for analyzing the performance of a network. The software management folder contains links for performing software upgrades of network devices. Preferably, software management folder contains such links as Add Image To Library, Search Library, Browse Library, Distribute Images, Browse Job Status, Browse History, Search History By Device and Search History By User. In these links, the term "Library" refers to software image depository 158.

Using the Add Image to Library link, a user may select a software image to download to a particular network device. Using the Search Library link, a user may search the library for a particular software image to download to a network device. Using the Browse Library link, a user may browse the library for a particular software image that they would like to download to a network device. The Distribute Images link provides an interface that allows a user to cause the selected software images to be download to their corresponding network device. The Browse Job Status link provides an interface that allows a user to check the status of a software image download job that has been initiated by the user. The Browse History link provides an interface that allows a user to view a history of all previous software image download jobs. The Search History By Device link provides an interface that allows a user to view a history of all previous software image download jobs that correspond to a particular device. The Search History By User link provides an interface that allows a user to view a history of all previous software image download jobs that correspond to a particular user.

Managing Problem Reports

In certain embodiments, a problem report mechanism is provided that allows a user to generate on-line problem reports for errors, failures, or other problems that are encountered with network devices in a managed network. In one embodiment, the user has the option of causing a set of diagnostic tests to be automatically performed on the network devices in order to obtain detailed diagnostic information. By generating an on-line problem report, the user may report a problem with a network device to the vendor or manufacturer of the device.

Figure 5:
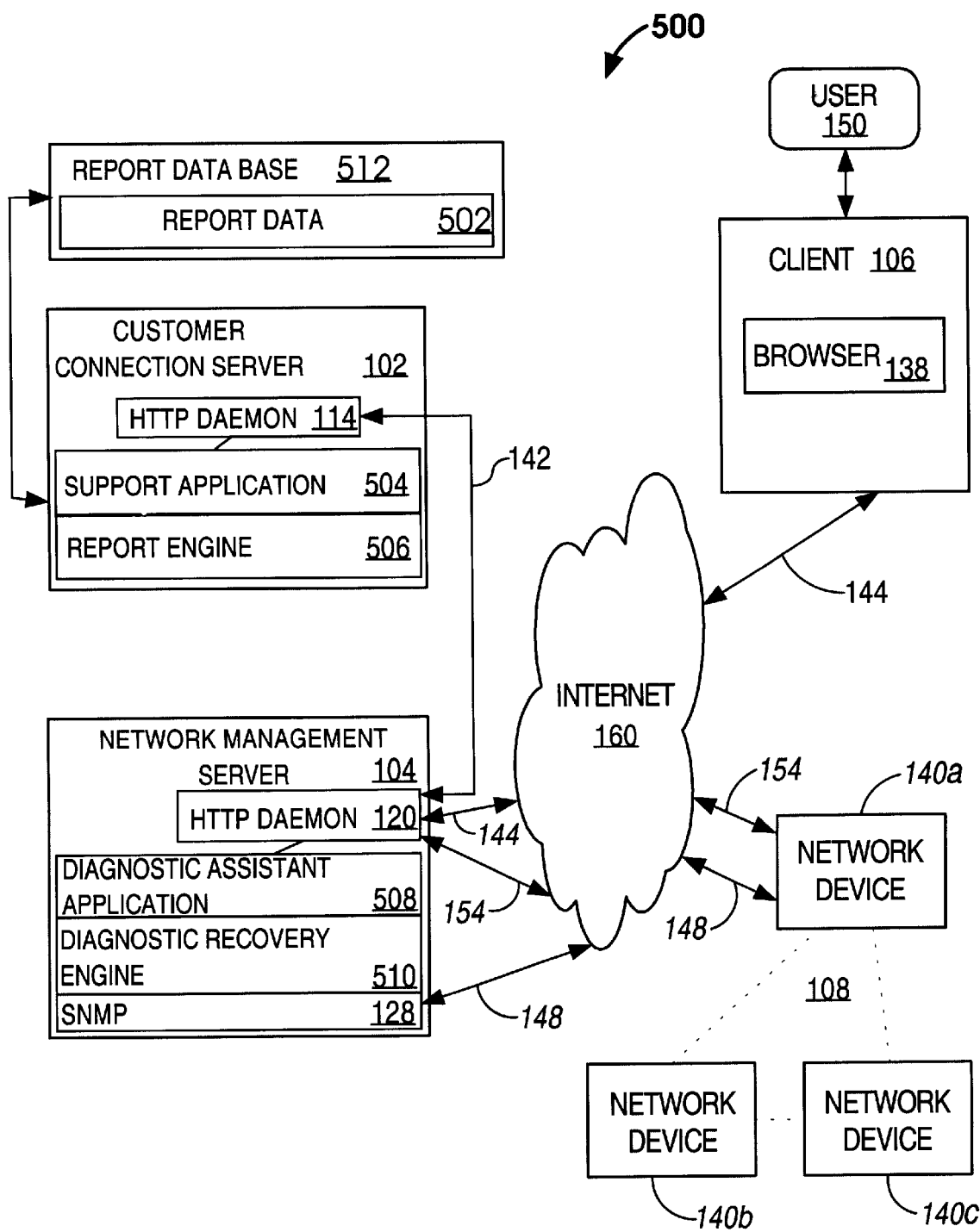
FIG. 5 illustrates is a block diagram of an alternative system in which an embodiment of the invention may be utilized.

FIG. 5 illustrates is a block diagram of a data processing system 500. FIG. 5 is similar to FIG. 1 and like numbered components perform similar functions and are structured in similar ways. Generally, the system 500 includes a network management server 104, a customer connection server 102, a client 106, a report database 512 and a network 108.

The report database 512 is a database server or database system, such as a Sybase® or Oracle® database server and associated components. The report database 512 manages data tables that store report data 502. The report data 502 contain report and diagnostic information that is associated with certain network devices.

The customer connection server 102 contains a support application 504 and a report engine 506. The support application 504 provides a back-end, server-side mechanism for supervising operations relating to the storing of diagnostic information about certain network devices that are contained in network 108. The support application 504 is coupled to report engine 506. The report engine 506 is used to store report data 502 in report database 512.

The network management server 104 contains a diagnostic assistant application 508 which provides a back-end, server-side mechanism for supervising operations relating to views of diagnostic information about the network 108 that are requested by the client 106. The diagnostic assistant application 508 is coupled to a diagnostic discovery engine 510 that is used to perform diagnostic tests to obtain diagnostic information about the network devices 140*a*–140*c* in network 108.

Figure 6:
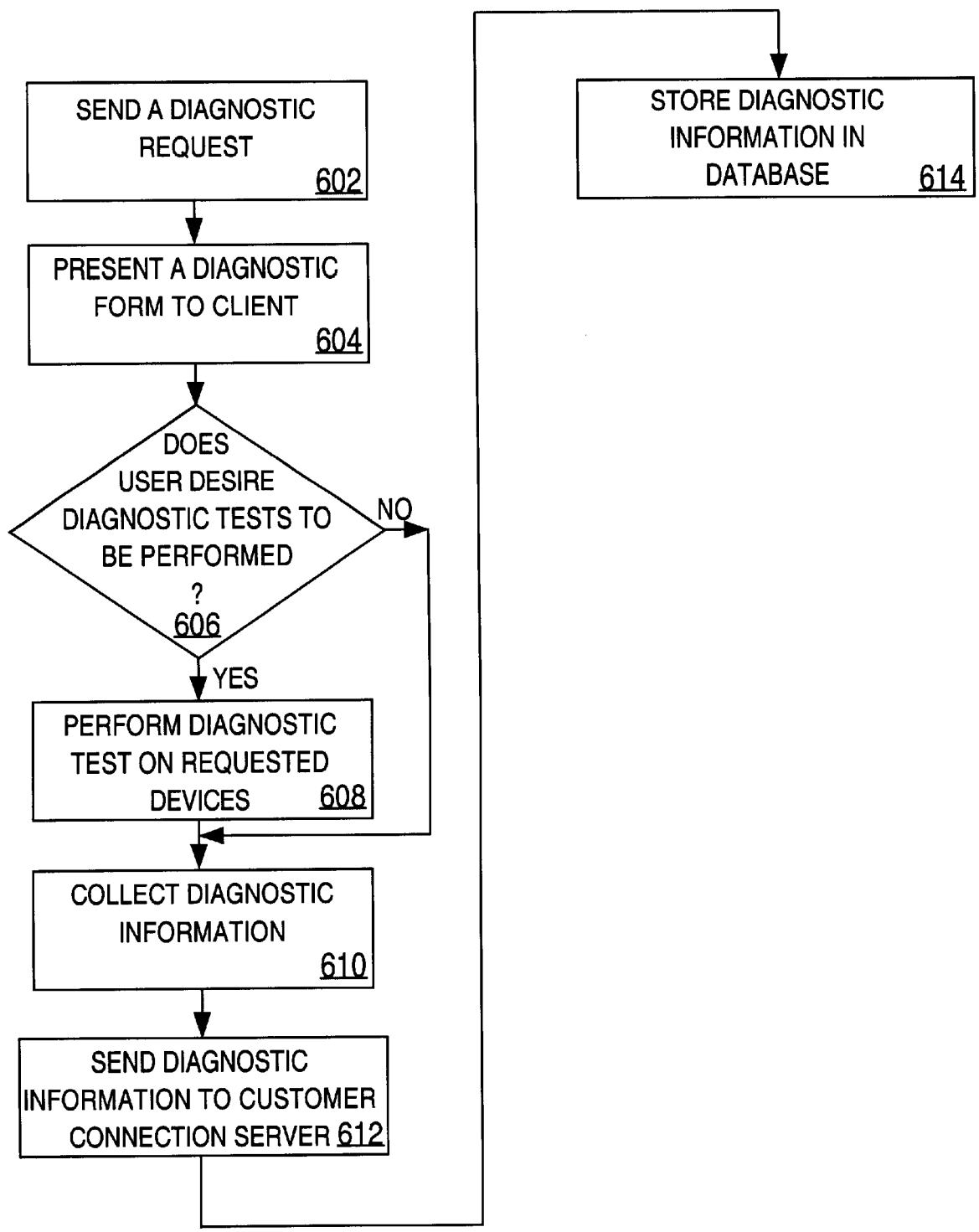
FIG. 6 is a flow diagram that illustrates a method of diagnostic reporting of network device problems.

FIG. 6 is a flow diagram that illustrates diagnostic reporting of network device problems in accordance with an embodiment of the invention. The steps of FIG. 6 will be explained with reference to the components of FIG. 5.

As shown by block 602, a diagnostic report is sent. For example, user 150 establishes a connection 144 with network management server 104 using browser 138 on client 106. To establish the connection 144, user 150 is required to enter a login ID and password. The login ID and password are used by the network management server 104 to authenticate client 106 as an authorized client.

As shown by block 604, a diagnostic report form is presented to the client. For example, diagnostic assistant application 508 sends diagnostic interface data to client 106 that is displayed on browser 138. In certain embodiments, the diagnostic interface data causes an HTML page to be displayed on browser 138. The user 150 may then interact with the HTML page to enter problem report information to describe any anomalies that have occurred on the network devices 140*a*–*c* in network 108.

As shown by block 606, the user decides whether or not diagnostic tests are to be performed on one or more network devices in network 108. If the user chooses not to perform any diagnostic tests, then control proceeds to step 610.

However, if the user 150 chooses to perform one or more diagnostic tests on the network devices, then at block 608, the diagnostic tests are carried out. For example, the diagnostic discovery engine 510 performs diagnostic tests on the selected network devices. To perform the diagnostic tests, the diagnostic discovery engine 510 interfaces with functions in the SNMP Function Library 128 to establish an SNMP connection 148 with the network devices 140*a*, 140*b*, 140*c* in the network 108. The diagnostic discovery engine 510 then causes certain tests to be performed on the selected network devices, for example, by sending and receiving one or more SNMP messages.

As shown by block 610, diagnostic information is collected. For example, as the diagnostic tests are performed, the diagnostic discovery engine 510 extracts and collects diagnostic information from the network devices.

As shown by block 612, diagnostic information is sent to a server that can connect to the customer or user. For example, the diagnostic discovery engine 510 causes the user entered problem report and any collected diagnostic information to be sent to the customer connection server 102 over connection 142.

As shown by block 614, diagnostic information is stored in a database. For example, the support application 504 receives the diagnostic information and passes it to the report engine 506. The report engine 506 then causes the diagnostic information to be stored as report data 502 in report database 512.

Hardware Overview

Figure 7:
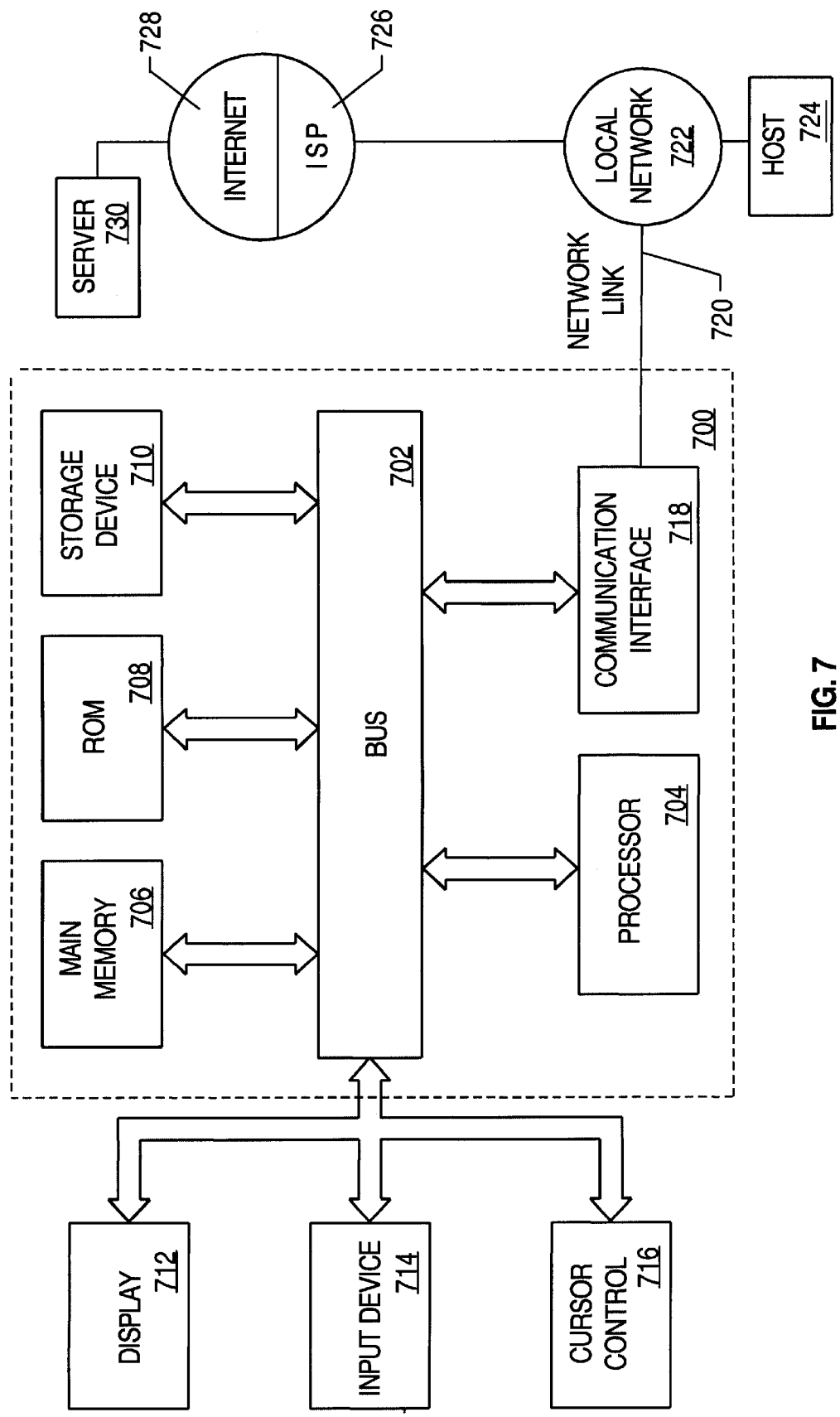
FIG. 7 is a block diagram of a computer system hardware arrangement that can be used to implement the invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for integrating an external network with a network management system. According to one embodiment of the invention, the integration of a network management system with an external network is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for integrating an external network with a network management system is described as described herein.

The received code may be executed by processor 704 as it is received, and/or stored in storage device 710, or other non-volatile storage for later execution. In this manner, computer system 700 may obtain application code in the form of a carrier wave.

The invention is not limited to the context shown in FIGS. 1 and 5, and the spirit and scope of the invention include other contexts and applications in which the upgrade and diagnostic functions described herein are available to other mechanisms, methods, programs, and processes. The specification and drawings are, accordingly, to be regarded in an illustrative rather than a restrictive sense.

What is claimed is:

1. A method for automated upgrading of one or more network routing devices in a managed network, the method comprising the steps of:

issuing one or more discovery messages to discover network routing device information from the one or more network routing devices, wherein the network routing device information includes software operating system configuration data about the one or more network routing devices of the managed network;

identifying, for a network device among the one or more network devices, one or more software operating system image files that contain a software operating system upgrade for upgrading an operating system previously loaded in said network routing device;

verifying that the one or more software operating system image files are compatible with such network routing device based on the discovered network routing device information; and storing the one or more software operating system image files in a location facilitating download of the one or more software operating system image files to the network routing device.

2. The method recited in claim 1, wherein the step of storing further comprises the steps of:

retrieving a copy of the one or more software operating system image files from a repository of image files and;

communicating the copy of the one or more software operating system image files to a network management server.

3. The method recited in claim 2, further comprising the step of scheduling the one or more software operating system image files to be downloaded to said network routing device at a predetermined time.

4. The method recited in claim 3, further comprising the step of downloading the one or more software operating system image files to said network routing device at the predetermined time.

5. The method recited in claim 1, wherein the step of identifying comprises the steps of:

determining a device type identifier associated with a particular routing device of the managed network;

retrieving, from a database that associates names of the software operating system image files with one or more device type identifier values, one or more of the names that are associated with the device type identifier of the particular routing device.

6. The method recited in claim 5, wherein the step of identifying further comprises the steps of:

displaying the one or more of the names that are associated with the device type identifier of the particular routing device;

receiving information identifying a software operating system version and a subset version of the software operating system image files associated with the one or more of the names that are displayed.

7. The method recited in claim 1, further comprising the step of:

displaying, to a client associated with the managed network, a view of the one or more software operating system image files.

8. The method recited in claim 1, wherein the step of verifying comprises the steps of:

determining a minimum amount of memory of the routing device that is necessary to load the one or more software operating system image files into the routing device;

determining an actual amount of memory in the routing device; and determining whether the actual amount is equal to or greater than the minimum amount.

9. The method recited in claim 1, wherein the step of discovering network routing device information comprises the step of discovering device information from the one or more network routing devices using a management server coupled by a network link to the managed network, and wherein the step of identifying comprises the steps of identifying, for each network routing device among the one or more network routing devices, one or more software operating system image files that contain an upgrade for such network routing device using a second server coupled to a database of software modules and coupled by a data connection to the management server.

10. The method recited in claim 1, wherein:

the step of issuing one or more discovery messages comprises the steps of sending one or more SNMP messages to the one or more network routing devices; and the method further comprising the step of, receiving one or more SNMP message responses from the one or more network routing devices.

11. A computer-readable medium carrying one or more sequences of instructions for automated upgrading of one or more network routing devices in a managed network, wherein execution of the one or more sequences of instructions by one or more processors causes the one or more processors to perform the steps of:

issuing one or more discovery messages to discover network routing device information from the one or more network routing devices, wherein the network routing device information includes software operating system configuration data about the one or more network routing devices of the managed network;

identifying, for a network device among the one or more network devices, one or more software operating system image files that contain a software operating system upgrade for upgrading an operating system previously loaded in said network routing device;

verifying that the one or more software operating system image files are compatible with such network routing device based on the discovered network routing device information; and storing the one or more software operating system image files in a location facilitating download of the one or more software operating system image files to the network routing device.

12. The computer-readable medium recited in claim 11, wherein the step of storing further comprises the steps of:

retrieving a copy of the one or more software operating system image files from a repository of image files and;

communicating the copy of the one or more software operating system image files to a network management server.

13. The computer-readable medium recited in claim 12, further comprising instructions for performing the step of scheduling the one or more software operating system image files to be downloaded to said network routing device at a predetermined time.

14. The computer-readable medium recited in claim 13, further comprising instructions for performing the step of downloading the one or more software operating system image files to said network routing device at the predetermined time.

15. The computer-readable medium recited in claim 11, wherein the step of identifying comprises the steps of:
  determining a device type identifier associated with a particular routing device of the managed network;
  retrieving, from a database that associates names of the software operating system image files with one or more device type identifier values, one or more of the names that are associated with the device type identifier of the particular routing device.

16. The computer-readable medium recited in claim 15, wherein the step of identifying further comprises the steps of:
  displaying the one or more of the names that are associated with the device type identifier of the particular routing device;
  receiving information identifying a software operating system version and a subset version of the software operating system image files associated with the one or more of the names that are displayed.

17. The computer-readable medium recited in claim 11, further comprising instructions for performing the step of:
  displaying, to a client associated with the managed network, a view of the one or more software operating system image files.

18. The computer-readable medium recited in claim 11, wherein the step of verifying comprises the steps of:
  determining a minimum amount of memory of the routing device that is necessary to load the one or more software operating system image files into the routing device;
  determining an actual amount of memory in the routing device; and
  determining whether the actual amount is equal to or greater than the minimum amount.

19. The computer-readable medium recited in claim 11, wherein:
  the step of issuing one or more discovery messages comprises the steps of sending one or more SNMP messages to the one or more network routing devices; and
  the computer-readable medium further comprising instructions for performing the step of,
    receiving one or more SNMP message responses from the one or more network routing devices.

20. The computer-readable medium recited in claim 11, wherein the step of discovering network routing device information comprises the step of discovering device information from the one or more network routing devices using a management server coupled by a network link to the managed network, and wherein the step of identifying comprises the steps of identifying, for each network routing device among the one or more network routing devices, one or more software operating system image files that contain an upgrade for such network routing device using a second server coupled to a database of software modules and coupled by a data connection to the management server.

21. A computer apparatus comprising:
  a processor; and
  a memory coupled to the processor, the memory containing one or more sequences of instructions for automated upgrading of one or more network routing devices in a managed network, wherein execution of the one or more sequences of instructions by the processor causes the processor to perform the steps of:
    issuing one or more discovery messages to discover network routing device information from the one or more network routing devices, wherein the network routing device information includes software operating system configuration data about the one or more network routing devices of the managed network;
    identifying, for a network device among the one or more network devices, one or more software operating system image files that contain a software operating system upgrade for upgrading an operating system previously loaded in said network routing device;
    verifying that the one or more software operating system image files are compatible with such network routing device based on the discovered network routing device information; and
    storing the one or more software operating system image files in a location facilitating download of the one or more software operating system image files to the network routing device.

22. The computer apparatus recited in claim 21, wherein the step of storing further comprises the steps of:
  retrieving a copy of the one or more software operating system image files from a repository of image files and;
  communicating the copy of the one or more software operating system image files to a network management server.

23. The computer apparatus recited in claim 22, further comprising instructions for performing the step of scheduling the one or more software operating system image files to be downloaded to said network routing device at a predetermined time.

24. The computer apparatus recited in claim 23, further comprising instructions for performing the step of downloading the one or more software operating system image files to said network routing device at the predetermined time.

25. The computer apparatus recited in claim 21, wherein the step of identifying comprises the steps of:
  determining a device type identifier associated with a particular routing device of the managed network;
  retrieving, from a database that associates names of the software operating system image files with one or more device type identifier values, one or more of the names that are associated with the device type identifier of the particular routing device.

26. The computer apparatus recited in claim 25, wherein the step of identifying further comprises the steps of:
  displaying the one or more of the names that are associated with the device type identifier of the particular routing device;
  receiving information identifying a software operating system version and a subset version of the software operating system image files associated with the one or more of the names that are displayed.

27. The computer apparatus recited in claim 21, further comprising instructions for performing the step of:
  displaying, to a client associated with the managed network, a view of the one or more software operating system image files.

28. The computer apparatus recited in claim 21, wherein:
  the step of issuing one or more discovery messages comprises the steps of sending one or more SNMP messages to the one or more network routing devices; and
  the computer apparatus further comprising instructions for performing the step of, receiving one or more SNMP message responses from the one or more network routing devices.

29. The computer apparatus recited in claim 21, wherein the step of verifying comprises the steps of:

determining a minimum amount of memory of the routing device that is necessary to load the one or more software operating system image files into the routing device;

determining an actual amount of memory in the routing device; and determining whether the actual amount is equal to or greater than the minimum amount.

30. The computer apparatus recited in claim 21, wherein the step of discovering network routing device information comprises the step of discovering device information from the one or more network routing devices using a management server coupled by a network link to the managed network, and wherein the step of identifying comprises the steps of identifying, for each network routing device among the one or more network routing devices, one or more software operating system image files that contain an upgrade for such network routing device using a second server coupled to a database of software modules and coupled by a data connection to the management server.

31. A computer apparatus comprising:

means for discovering network device information from one or more network routing devices, wherein the network device information describes the one or more network routing devices of the managed network;

means for identifying, for a network routing device among the one or more network routing devices, one or more software operating system image files that contain a software operating system upgrade for upgrading an operating system previously loaded in said network routing device; and means for verifying that the one or more software operating system image files are compatible with such network routing device based on the discovered network device information; and means for storing the one or more software operating system image files in a location facilitating download of the one or more software operating system image files to the network routing device.

32. A method for facilitating automated upgrading of one or more network routing devices in a managed network, the method comprising the steps of:

issuing one or more discovery messages to discover network device information from the one or more network routing devices, wherein the network routing device information includes software operating system configuration data that identifies current software operating system configurations of the one or more network routing devices;

identifying, for a network routing device among the one or more network routing devices, one or more software operating system image files that comprise an operating system upgrade for upgrading the current software operating system configuration of the one or more network routing devices; and determining whether the one or more software operating system image files are compatible with the current software operating system configuration of the one or more network routing devices based on the discovered network device information; and storing the one or more software operating system image files in a location facilitating download of the one or more software operating system image files to the network routing device only when the one or more software operating system image files are compatible with the current software operating system configuration of the one or more network routing devices.

33. The method as recited in claim 32, further comprising the steps of, when the one or more software operating system image files are incompatible with the current software operating system configuration of the one or more network routing devices, displaying one or more recommendations of other software operating system image files that are compatible with the current software operating system configuration of the one or more network routing devices.

* * * * *